United States Patent [19]

Faatz et al.

[11] 4,411,510

[45] Oct. 25, 1983

[54] APPARATUS FOR COMPENSATING FOR THE REBOUNDING OF AN AUTOMATIC DIAPHRAGM IN A PHOTOGRAPHIC OBJECTIVE

[75] Inventors: Rudi Faatz, Heuchelheim; Siegfrid Moeller, Eichenzell; Friedel Ruehl; Adolf Steuernagel, both of Wetzlar, all of Fed. Rep. of Germany

[73] Assignee: Ernst Leitz Wetzlar GmbH, Wetzlar, Fed. Rep. of Germany

[21] Appl. No.: 333,339

[22] Filed: Dec. 22, 1981

[30] Foreign Application Priority Data

Jan. 9, 1981 [DE] Fed. Rep. of Germany ....... 3100376

[51] Int. Cl.³ .............................................. G03B 9/07
[52] U.S. Cl. ........................................................ 354/272
[58] Field of Search ............... 354/270, 271, 272, 273, 354/274, 252

[56] References Cited

U.S. PATENT DOCUMENTS 3,864,714  2/1975  Sasaki ................................. 354/272
4,319,824  3/1982  Rossmann ......................... 354/272

*Primary Examiner*—A. A. Mathews
*Attorney, Agent, or Firm*—Schwartz, Jeffery, Schwaab, Mach, Blumenthal & Koch

[57] ABSTRACT

Apparatus for at least partially compensating for the rebound impact of an automatic diaphragm in a photographic objective comprising a diaphragm control ring for driving the leaves of the diaphragm and a diaphragm preselector ring for predetermining the diaphragm aperture; the rebound impact being defined as the recoil produced according to the laws of elastic collisions when the diaphragm control ring which shuts the diaphragm engages the stop of the diaphragm preselector ring; said apparatus comprising at least one movable auxiliary mass which frictionally opposes the rebound movement.

9 Claims, 4 Drawing Figures

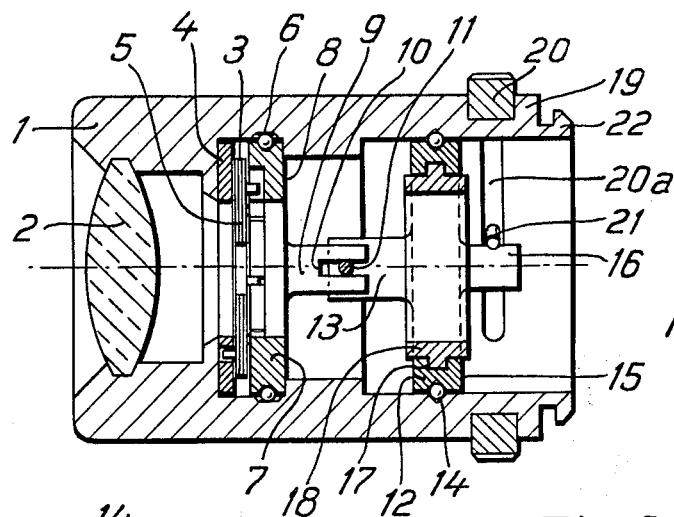
Fig. 1
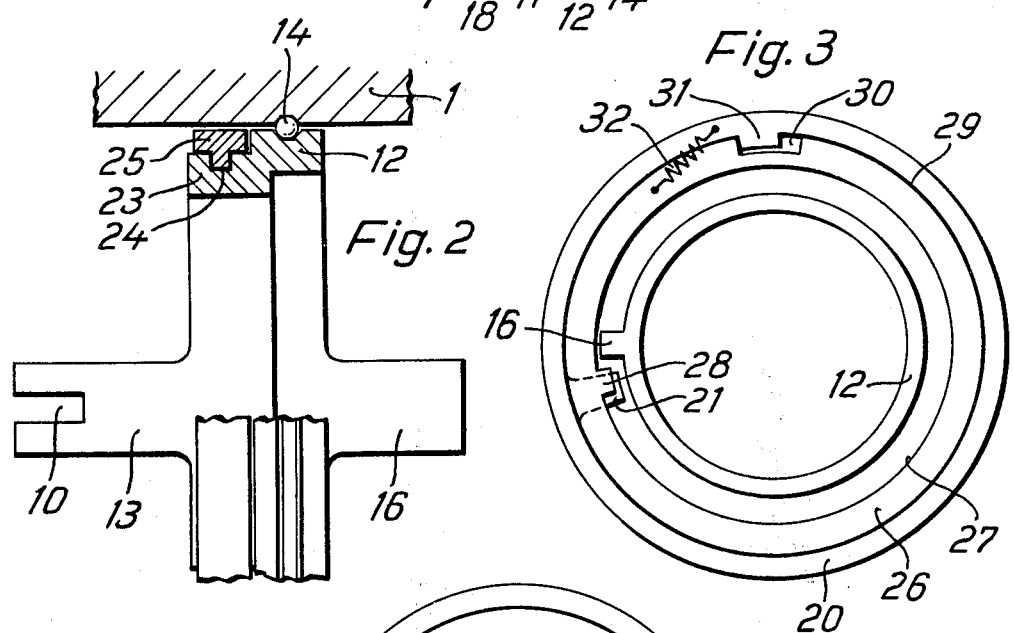
Fig. 2
Fig. 3
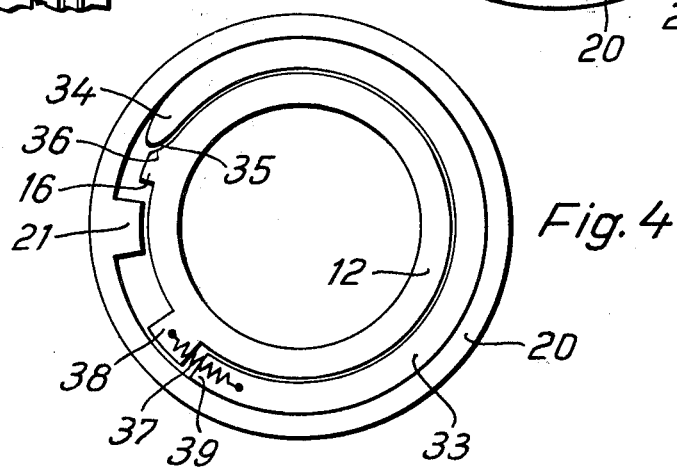
Fig. 4

APPARATUS FOR COMPENSATING FOR THE REBOUNDING OF AN AUTOMATIC DIAPHRAGM IN A PHOTOGRAPHIC OBJECTIVE

BACKGROUND OF THE INVENTION

The present invention relates to a device for at least partially compensating for the rebound impact of an automatic diaphragm in a photographic objective having a diaphragm preselector ring with a stop for preselecting the diaphragm aperture and a diaphragm control ring for actuating or driving the leaves of the automatic diaphragm.

It is known to at least partially compensate for the rebound impact, which is defined as the recoil generated by the impact of the diaphragm control ring closing the iris diaphragm of a photographic objective upon the stop of the diaphragm preselector ring, in accordance with the laws of elastic collisions, by providing a predetermined friction in the pivot bearing of the diaphragm control ring or by transmitting the kinetic energy to the diaphragm preselector ring. It is also known to eliminate the rebound impact by using so-called catch springs or straps which act directly or indirectly on the diaphragm preselector ring.

Another known approach is to attenuate the rebound of the diaphragm control ring with the "bumper block" effect, so that the effect of the rebound impact on the diaphragm aperture remains negligibly small. All of the known devices are subject to the disadvantages that no controlled damping of the rebound impact is possible and that the manufacture of the rebound damping means is difficult.

SUMMARY OF THE INVENTION

Accordingly, it is the object of the present invention to provide an improved device for compensating for the rebound impact of an automatic diaphragm in a photographic objective.

A further object of the present invention is to provide apparatus for compensating for the rebound impact which is capable of achieving a desired or controlled compensation of the rebounding effect.

Another object of the present invention is to provide apparatus for compensating for the rebound impact which substantially avoids the manufacturing and assembly difficulties attendant to known devices.

These and other objects of the invention are achieved by providing apparatus for at least partially compensating for the rebound impact of the automatic diaphragm in a photographic objective having a diaphragm preselector ring with a stop for preselecting the diaphragm opening and a diaphragm control ring for driving the leaves of the automatic diaphragm, said compensating apparatus comprising at least one movable auxiliary mass which frictionally opposes the rebound impact.

In one preferred aspect of the invention, the auxiliary mass has the form of a cylinder, and its dimensions are selected so that the frictional forces opposing the rebounding are produced between the auxiliary mass and the diaphragm control ring.

In another preferred aspect of the invention, the auxiliary mass is a rider on the diaphragm control ring, and its dimensions are selected such that a defined frictional force is produced between the rider and the diaphragm control ring.

In yet another preferred aspect of the invention, the auxiliary mass comprises a friction riing provided with an anvil, and its dimensions are chosen such that a defined frictional force is produced between the friction ring and the diaphragm preselector ring.

In a still further preferred aspect of the invention, the auxiliary mass is movably mounted on the diaphragm with a spring for controlling its movement and produces a defined frictional clamping force in conjunction with the diaphragm control ring and the diaphragm preselector ring.

BRIEF DESCRIPTION OF THE DRAWINGS

The invention will be described in further detail with reference to the accompanying drawings, wherein:

FIG. 1 is a sectional side elevation of a photographic objective with an automatic diaphragm and a rebound impact compensating device according to the invention.

FIG. 2 is a sectional partial side elevational view of the details of an alternate embodiment of the invention.

FIG. 3 is a sectional rear detail view of a further embodiment of the invention in which the auxiliary mass is provided with an anvil.

FIG. 4 is a cross sectional rear detail view of a stll further embodiment of the invention in which the auxiliary mass produces a frictional clamping force.

DETAILED DESCRIPTION OF PREFERRED EMBODIMENTS

FIG. 1 schematically illustrates a photographic objective with an automatic diaphragm. For reasons of clarity, structural parts required for focusing of the objective have been omitted from the drawing.

The photographic objective comprises an objective tube 1 having an imaging system 2 mounted therein. An automatic diaphragm 3, which closes under the force of a spring (not shown) is located behind the imaging system 2. Automatic diaphragm 3 comprises a leaf mount 4, diaphragm leaves 5 and a leaf guide ring 7 which moves on ball bearings 6. The leaf guide ring 7 is provided on its surface 8 remote from the diaphragm leaves 5, with a projection 9 having a U-shaped slot or recess 10 therein. A slide 11 of a driver 13, which forms a unitary body with the diaphragm control ring 12, is engaged in the U-shaped recess 10. Slide 11 is adapted to move back and forth in slot 10 during focusing of the objective. The diaphragm control ring 12 is mounted on ball bearings 14 for easy rotation in the objective tube 1. The diaphragm control ring 12 carries, on its side 15 opposite the driver 13, a drive piece 16, which drivably engages the camera (not shown) in a conventional manner.

The inner surface of the diaphragm control ring 12 is provided with a U-shaped annular groove 17, and a suitably shaped friction ring 18 is inserted therein. The rear end 19 of the objective tube 1 carries a diaphragm preselector ring 20 with a diaphragm stop 21, extending through a slit 20a into the objective tube 1. To secure the photographic objective to the camera, objective tube 1 is provided with a bayonet fitting 22.

The operation of the above-described device is as follows:

Upon insertion of the photographic objective in a camera, the automatic diaphragm 3 is opened by the diaphragm control ring 12 which enters into driving engagement with the camera by means of drive piece 16, and the spring (not shown) which closes the automatic diaphragm is stressed. By actuating the diaphragm preselection ring 20, the diaphragm stop 21 is brought into a position corresponding to a desired aperture size of the automatic diaphragm 3. When the camera is triggered, the automatic diaphragm 3 closes. The closing motion is stopped by the diaphragm stop 21, which is struck by drive piece 16. According to the laws of elastic collisions, a rebound of the diaphragm control ring 12 would now take place, whereby the diaphragm would open to an undesirable extent resulting in an erroneous exposure and in deviations in the depth of focus.

However, in the described apparatus, the rebound momentum is compensated for by friction ring 18, which works as an auxiliary mass within the diaphragm control ring 12. While the diaphragm control ring, which was accelerated by the force of the spring when the camera was triggered, is being suddenly braked, the friction ring 18, whose rotational movement is unrestricted, continues to rotate because of its inertia until it is gradually braked by the friction between it and the diaphragm control ring 12.

Turning now to FIG. 2, there is illustrated an alternate embodiment of the invention in which the diaphragm control ring 12, which moves on ball bearings 14 in the objective tube 1, is provided with a shoulder 23 and an annular groove 24 formed on its outer circumference. A friction ring 25, having a T-shaped cross section, "rides" on the diaphragm control ring 12 with the stem of the "T" received in annular groove 24. As in the case of the friction ring 18 described in connection with FIG. 1, the rotational range of friction ring 25 is unrestricted, and it functions in an analagous manner to attenuate or compensate for the rebound impact of the automatic diaphragm.

In contrast to the embodiments illustrated in FIGS. 1 and 2 in which the additional mass which compensates for the energy of the rebound impact cooperates with the diaphragm control ring 12, FIG. 3 schematically illustrates an embodiment in which the auxiliary mass cooperates with the diaphragm preselector ring 20.

For this purpose, a stop ring 26 is mounted for easy rotation within the diaphragm preselection ring 20. Stop ring 26 is provided on its inner circumference 27 with a stop nose or anvil 28. The outer circumference 29 of stop ring 26 is provided with a recess 30, which is engaged by a movement limiting cam 31 on the diaphragm control ring 20. Diaphragm preselection ring 20 and stop ring 26 are non-positively connected with each other by means of a spring 32 in such a way that the edge of the stop nose 28 adjacent to the drive piece 16 is located in front of the edge of the diaphragm stop 21.

During the closing of the automatic diaphragm 3, the drive piece 16 of diaphragm control ring 12 initially strikes the stop nose 28 of stop ring 26. Stop ring 26 is designed to have the same moment of inertia as diaphragm control ring 12. Consequently, stop ring 26 accepts all of the energy of diaphragm ring 12 and causes drive piece 16, driven by the force of the actuating spring closing the automatic diaphragm 3, to gently contact the diaphragm stop 21 of the diaphragm preselection ring 20. When automatic diaphragm 3 is returned to the "open" position, the spring 32 returns stop ring 26 to its initial position.

FIG. 4 illustrates a further embodiment of the invention in which diaphragm control ring 12 carries a spring supported auxiliary mass in the form of a cylindrical clamping piece 33. When drive piece 16 strikes the diaphragm stop 21 on diaphragm preselector ring 20, clamping piece 33 effects a clamping action. For this purpose, the end 34 of clamping piece 33 is provided with a bevel 35, while a similar bevel 36 is provided on drive piece 16. As drive piece 16 impacts against diaphragm stop 21, clamping piece 33 initially remains in motion because of its inertia and runs up with its bevel 35 on the bevel 36 on drive segment 16. In the process, it produces a clamping action between the diaphragm preselector ring 20 and the diaphragm control ring 12. The clamping action works against the recoil energy or rebound impact of the diaphgram control ring 12. The clamping action is then released by a spring 37, which extends between a nose 38 on diaphragm control ring 12 and the other end 39 of clamping piece 33.

The foregoing description of preferred embodiments has been set forth merely to illustrate the invention and is not intended to be limiting. Since modifications of the disclosed embodiments incorporating the spirit and substance of the invention may occur to persons skilled in the art, the scope of the invention is to be limited solely with respect to the appended claims and equivalents.

We claim:

1. Apparatus for at least partially compensating for the rebound impact of an automatic diaphragm in a photographic objective having a diaphragm preselector ring with a stop for preselecting the diaphragm opening and a diaphragm control ring for driving the leaves of the automatic diaphragm, said compensating apparatus comprising at least one movable auxiliary means frictionally engaging an element of said objective and set in motion in response to movement of said diaphragm control ring for counteracting said rebound impact by friction, whereby the energy of movement of said diaphragm control ring is at least partially dissipated by friction.

2. Apparatus according to claim 1, wherein the auxiliary mass has the form of a cylinder, and the dimensions of the auxiliary mass are selected so that the frictional forces which counteract the rebound impact are produced between the auxiliary mass and the diaphragm control ring.

3. Apparatus according to claim 2, wherein said auxiliary mass comprises an annular friction ring mounted for unrestricted rotation inside said diaphragm control ring.

4. Apparatus according to claim 2, wherein the auxiliary mass is disposed as a rider on the diaphragm control ring, and the dimensions of the auxiliary mass are selected such that a defined frictional force is produced between the rider and the diaphragm control ring.

5. Apparatus according to claim 4, wherein said auxiliary mass comprises an annular friction ring mounted for unrestricted rotation on a shoulder formed on the outer circumference of said diaphragm control ring.

6. Apparatus according to claim 1, wherein the auxiliary mass comprises a friction ring provided with an anvil, and the dimensions of the ring are chosen such that a defined frictional force is produced between the friction ring and the diaphragm preselector ring.

7. Apparatus according to claim 1, wherein said auxiliary mass comprises a stop ring frictionally engaging said diaphragm preselector ring, said stop ring being designed to have the same moment of inertia as said diaphragm control ring and bearing an anvil which is struck by a drive piece on the diaphragm control ring, whereby the momentum of the diaphragm control ring is transferred to the stop ring as the diaphragm control ring contacts the stop of the diaphragm preselector ring.

8. Apparatus according to claim 1, wherein the auxiliary mass is movably mounted on the diaphragm control ring; spring means are provided to control the movement of the auxiliary mass, and the auxiliary mass produces a defined frictional clamping force in conjunction with the diaphragm control ring and the diaphragm preselector ring.

9. Apparatus according to claim 8, wherein said auxiliary mass comprises a clamping piece disposed around said diaphragm control ring, one end of said clamping piece being provided with a bevel; said clamping piece initially remaining in motion when a drive piece on the diaphragm control ring engages the stop on said diaphragm preselector ring and said bevel on said clamping piece engaging an opposing bevelled surface on said diaphragm control ring, whereby a clamping action is produced.

* * * * *